Jan. 17, 1933.  D. F. SPROUL  1,894,717
CUSHIONING DEVICE
Filed July 6, 1931

Inventor
Donald F. Sproul
By Gillson, Mann & Gettys

Patented Jan. 17, 1933

1,894,717

UNITED STATES PATENT OFFICE

DONALD F. SPROUL, OF CHICAGO, ILLINOIS, ASSIGNOR TO CARDWELL WESTINGHOUSE COMPANY, A CORPORATION OF DELAWARE

CUSHIONING DEVICE

Application filed July 6, 1931. Serial No. 548,914.

The invention relates to cushioning devices such as are employed to support truck bolsters of railway cars; its objects being to provide for the absorption of shocks due to track inequalities by the combined action of friction and springs, to secure smoothness of action and durability.

Figure 1:
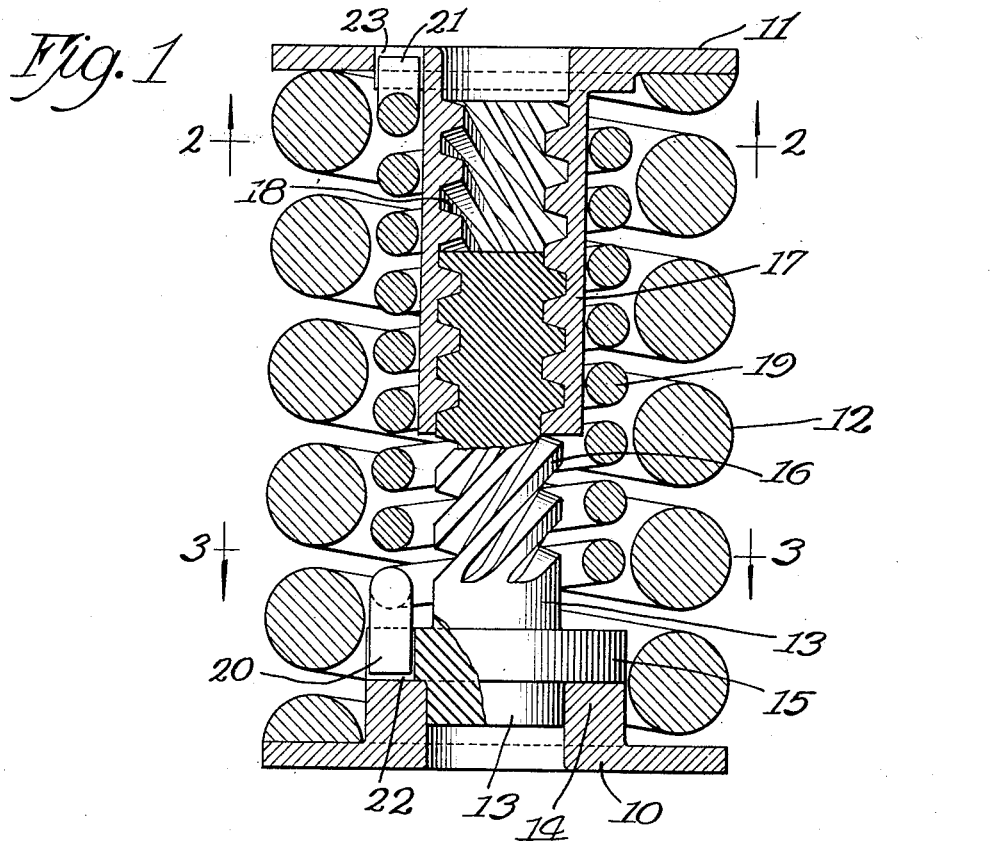
Figures 2, 3:
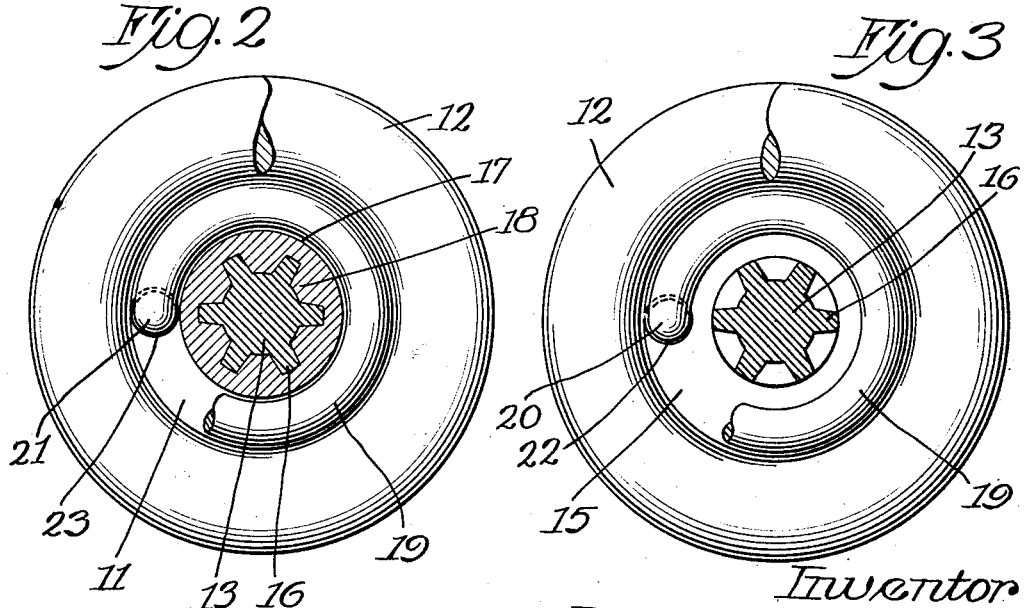

While the invention may be embodied in various forms, a preferred form of construction is hereinafter described and illustrated in the accompanying drawing, in which Fig. 1 is a central longitudinal view of the device; and Figs. 2 and 3 are transverse sections on the lines 2—2 and 3—3 of Fig. 1.

The device comprises a pair of followers 10, 11, adapted to seat, respectively, upon the lower arch of a truck frame and against the under face of a bolster. A powerful helical spring 12 is interposed between the two followers, and is of sufficient diameter to enclose the remaining elements of the device. These elements include a rotatable shaft 13, the lower end of which projects into a socket formed in a boss 14, extending inwardly from the follower 10, its inner end being flat to provide a bearing surface upon which a radial flange 15 of the shaft 13 seats and may turn.

Above the flange 15 the shaft 13 is threaded, as shown at 16, a plurality of threads, as shown six in number, of long pitch, being provided. The threaded end of the shaft extends into the barrel 17, projecting inwardly from the follower 11, of which it is an integral part, and is provided with internal threads 18, complementary to the threads 16. The length of the shaft and barrel is such as to permit ample movement toward each other of the followers 10, 11.

A helical spring 19 surrounds the shaft and barrel, its ends, 20, 21, being anchored in sockets 22, 23, formed, respectively, in the flange 15 and the follower 11.

Under the influence of compressive forces the two followers are caused to relatively approach against the resistance of the spring 12. The shaft 13 advances into the barrel 17, and consequently turning upon its axis by reason of its threaded engagement with the barrel, and in turning it winds up the spring 19, this spring being also shortened by the relative approach of the followers. Friction is developed between the flange 15 and the bearing face of the boss 14, also between the threads of the shaft and barrel.

Upon cessation of the compressive forces the parts are restored to normal position mainly by the expansion of the spring 12, and the unwinding of the spring 19. A too violent recoil is prevented by a comparatively slow movement of the screw, as such, as well as by the friction between the shaft flange and the follower boss and also between the screw threads.

I claim as my invention—

In a cushioning device, in combination, a pair of opposed followers one thereof carrying an instanding non-rotatable socket and the other having an instanding socketed boss, a shaft pivotally engaging the boss and having a flange seated on the end thereof, the shaft being in threaded engagement with the first-named socket, a helical spring surrounding the threaded elements and having its ends anchored, respectively, to the flange and to the opposite follower, and an expansion spring interposed between the followers.

In testimony whereof I affix my signature.

DONALD F. SPROUL.